Sept. 26, 1933.    G. APEL    1,928,216
SEPARATOR SHOE AND METHOD OF PRODUCING SAME
Filed June 14, 1929
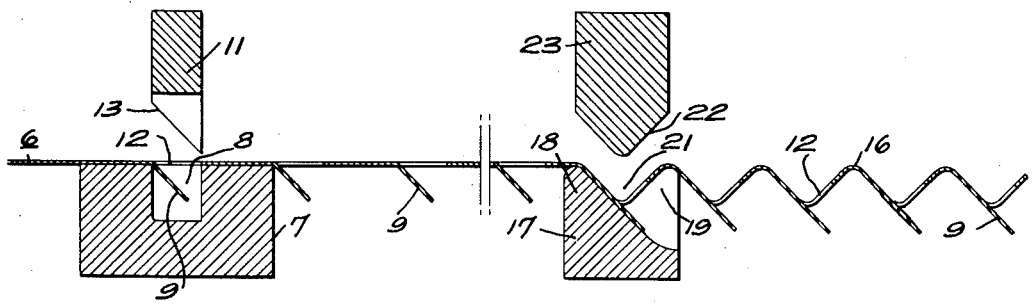
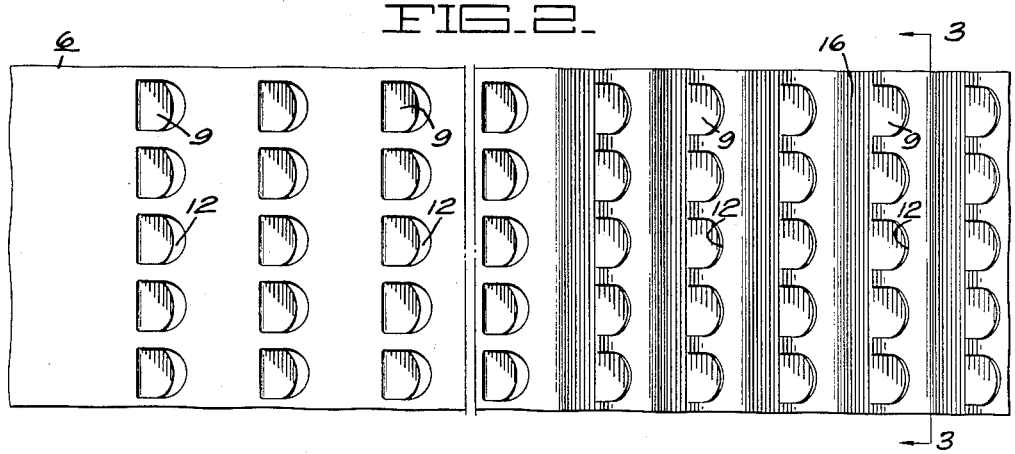
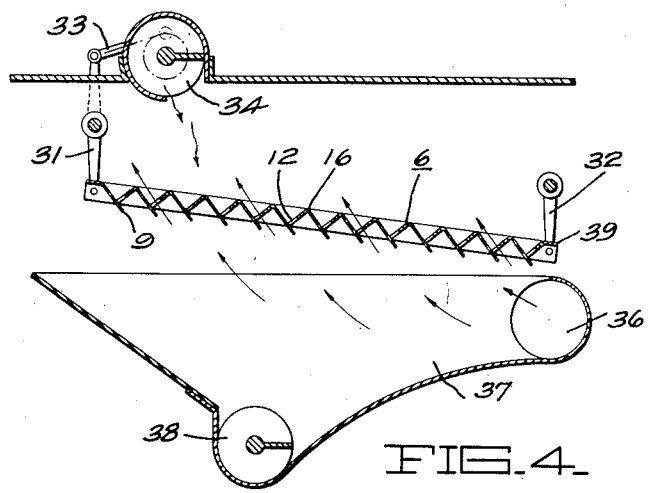
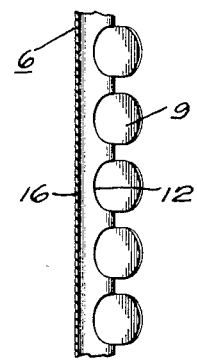
INVENTOR
George Apel
BY White, Prost & Fryer
ATTORNEYS Patented Sept. 26, 1933

1,928,216

UNITED STATES PATENT OFFICE 1,928,216

SEPARATOR SHOE AND METHOD OF PRODUCING SAME

George Apel, Stockton, Calif., assignor to Caterpillar Traction Co., San Leandro, Calif., a corporation of California Application June 14, 1929. Serial No. 370,837

5 Claims. (Cl. 209—397)

My invention relates to an article such as a separator shoe which is utilized in a harvester for separating grain from chaff, unthreshed heads, and other undesirable material. While my invention is capable of use in various environments I have used it successfully in the production of such an article and I shall therefore describe it in this connection.

Heretofore, in separating grain from chaff and foreign material in a harvester, it has been usual to employ a separator shoe fashioned of an ordinary screen joined to a frame. The providing of the separator shoe formed in this manner is usually an expensive operation for not only must the screen be cut to size but a suitable frame must be provided which is capable of withstanding the violent shaking given the screen in operation. Furthermore, when different grains are to be separated it is expedient that the size of screen be readily changeable. Accordingly, this necessitated that the manufacturer carry a large number of screens in stock.

It is an object of my invention to provide a separator shoe which is easy and simple to manufacture and very rugged to withstand operating conditions.

It is another object of my invention to provide a separator shoe which accomplishes the desired function in an improved manner.

Another object of my invention is to provide a method for forming a separator shoe which permits of a ready control to be effected over the formation of the shoe according to the grain with which the shoe is intended to be utilized.

A further object of my invention is to provide a simple method for the formation of separator shoes.

The invention possesses other advantageous features, some of which with the foregoing will be set forth at length in the following description where I shall outline in full that form of the separator shoe and method of producing the same of my invention, which I have selected for illustration in the drawing accompanying and forming part of the present specification. In said drawing I have shown one form of separator shoe embodying my invention, but it is to be understood that I do not limit myself to such form since the invention, as set forth in the claims, may be embodied in a plurality of forms.

In the drawing, to which I have made reference,

Fig. 1 is a schematic view illustrating a manner of providing a suitable separator shoe in accordance with the method of my invention.

Fig. 2 is a plan view of the plate the formation of which is illustrated in Fig. 1. The left hand portion of Fig. 2 corresponds to the plate shown in the left hand portion of Fig. 1 while the right hand portion of Figs. 1 and 2 likewise correspond.

Fig. 3 is a view through the plate shown in the right hand side of Fig. 2 taken along the line 3—3.

Fig. 4 illustrates a separator shoe, formed according to my invention, in its environment upon a harvester.

Fig. 5 is illustrative of the variation which can be readily accomplised in forming separator shoes according to my invention.

My invention may be briefly characterized as comprising a separator shoe and its method of formation from a sheet metal plate by striking out portions of the plate and by ribbing the plate in such a manner that a control is easily effected over the relationship of the portion struck out to the ribs formed upon the plate.

A method of forming a separator shoe which I have used successfully and which I here preferably disclose is illustrated schematically in Fig. 1. A plate of sheet metal 6 such as iron is advanced over a block 7. A depression 8 is usually provided in the block and is of a size corresponding to the size of a lip 9 desired to be formed upon the plate. A tool 11 is normally positioned above the depression and is adapted to be inserted into it in such a manner that a portion of the plate is struck out forming the desired lip and leaving a resulting aperture 12. By continuously advancing the plate over the block and by depressing the tool into the depression block a series of lips are readily struck out from the plate. If desired, the block 7 can extend for the full width of the plate and likewise a plurality of tools can be simultaneously depressed against the plate in such a manner that a plurality of the lips are simultaneously formed. In order to effect a variation in the angle of the lip to the plate I can readily vary the corresponding angles of the face 13 of the tool 11. The normal appearance of the plate after the striking out operation has been completed is much like that shown in the left hand portion of Fig. 2. Further, while I have shown an arcuately formed lip, other forms of lips can be provided by utilizing other tools.

I have found it desirable to provide transverse ribs 16 on the plate. These ribs serve to secure a more effective agitation and separation of the grain from the chaff and other undesirable material present and also to strengthen materially the shoe. The formation of these ribs is accomplished in any well known manner but I prefer to provide them much in the manner illustrated in the right hand portion of Fig. 1. As is there shown I preferably provide a die 17 provided with a continuous upstanding portion 18 and an angularly disposed interrupted portion 19. These portions define a transverse groove 21 into which the plate is forced by a conforming portion 22 on a tool 23. By varying the relationship or the amount by which the lip 11 projects across the groove 21 it is possible to control the extent to which the lip 9 extends from the rib on the plate and the resulting size of the aperture 12. This is easily accomplished by changing the relative position in which the plate is fed onto the block 17. Thus, as is particularly shown in Fig. 5, a wide variation in the relative position of the aperture and the lip relative to the rib on the plate can be secured. Thus, a plurality of shoes having apertures of varying sizes can be economically manufactured, by the same sequence of operations and by the same set of tools. It is, consequently, unnecessary to employ dies of different sizes to provide apertures and lips of varying sizes.

In practice my invention permits the plate to be fastened readily between two pivotally mounted levers 31 and 32 respectively. Lever 31 is usually attached to a crank not shown by means of an arm 33. This serves to rapidly vibrate the shoe. Grain is usually discharged from an auger 34 onto the separator shoe while usually a blast of air is discharged from a conduit 36 from a blower not shown. This, in combination with the rapidly vibrating separator shoe, serves to accomplish the desired separation of the grain kernels from the other materials present. The grain usually passes thru the apertures in the shoe down into the pan 37. From this pan the grain is carried away by another auger 38. The other materials are blown away or drop over edge 39 of the shoe away from the grain.

It is further to be noted that in accordance with my invention, separator shoes suitable for use with a variety of grains having kernels of different sizes are conveniently formed from a supply of raw material. Further, this is accomplished with a single machine, in accordance with the operations I have outlined.

I claim:

1. A separator shoe produced by forming a solid sheet of material, said shoe having ridges therein, proximate sides of adjacent ridges converging at a line, said shoe having an aperture therein, a boundary of said aperture being coincident with said line of convergence of said ridge sides, and a lip adjacent said aperture, said lip being an integral part of said sheet and joined to a ridge of said shoe along a line parallel to said line of convergence and spaced therefrom a distance substantially inversely proportional to the size of said aperture, whereby the desired size of aperture can be obtained in manufacturing the shoe by locating the line of convergence with respect to the line of joinder of the lip.

2. A separator shoe having apertures therein of a predetermined size, comprising a sheet corrugated to form ridges with depressions between the ridges and having cut out portions to provide lip forming portions integrally united with said sheet at spaced positions, each lip forming portion being of the same size as its complementary cut out portion, the ridges and depressions having been selectively spaced with respect to said positions of union of the lip forming portions with said sheet to provide said predetermined size apertures of less size than said cut out portions.

3. A separator shoe comprising a sheet of material having a cut out portion and a lip forming portion resulting from the cut, said lip forming portion being integrally united with said sheet, the sheet being bent along a predetermined line positioned intermediate the boundaries of said cut out portion, a part of the lip forming portion lying in the cut out portion and another part projecting beyond said bend line and beyond the plane of said sheet, leaving an aperture of predetermined size depending upon the position of said bend line with respect to the point of union of said lip forming portion with said sheet.

4. A ribbed separator shoe characterized by being formed by first depressing from a flat sheet of material a lip forming portion to leave a cut out portion of the same size as said lip forming portion, and then bending the sheet along a predetermined line positioned intermediate the boundaries of said cut out portion, said shoe having a part of the lip forming portion lying in and closing a part of the cut out portion at one side of said bend line, and another part of said lip forming portion projecting beyond said bend line to leave an aperture of predetermined size at the opposite side of said bend line, thus enabling the same set of tools and the same sequence of operations to be employed for the production of said separator shoe as could be employed for making another separator shoe having apertures of different size.

5. A separator shoe of sheet material bent along a preselected line to provide a rib apex with sides diverging from said line, one side having an aperture therein of predetermined size less than the depth of said side, the other side having a cut out portion, and a lip forming portion integrally joined to said sheet and coplanar with said other side to close said cut out portion, a part of said lip forming portion projecting beyond said bend line to provide a lip proper of the same size as said aperture, the position of said bend line with respect to the position of joining of said lip forming portion with said sheet determining the size of both said aperture and said lip proper.

GEORGE APEL.

CERTIFICATE OF CORRECTION.

Patent No. 1,928,216. September 26, 1933.

GEORGE APEL.

It is hereby certified that the name of the assignee in the above numbered patent was erroneously written and printed as "Caterpillar Traction Co." whereas said name should have been written and printed as Caterpillar Tractor Co.; and that the said Letters Patent should be read with this correction therein that the same may conform to the record of the case in the Patent Office.

Signed and sealed this 5th day of December, A. D. 1933.

F. M. Hopkins (Seal) Acting Commissioner of Patents.